May 12, 1959     A. A. KALINSKE     2,886,175
APPARATUS FOR TREATING A LIQUID WITH A GAS
Filed March 26, 1956
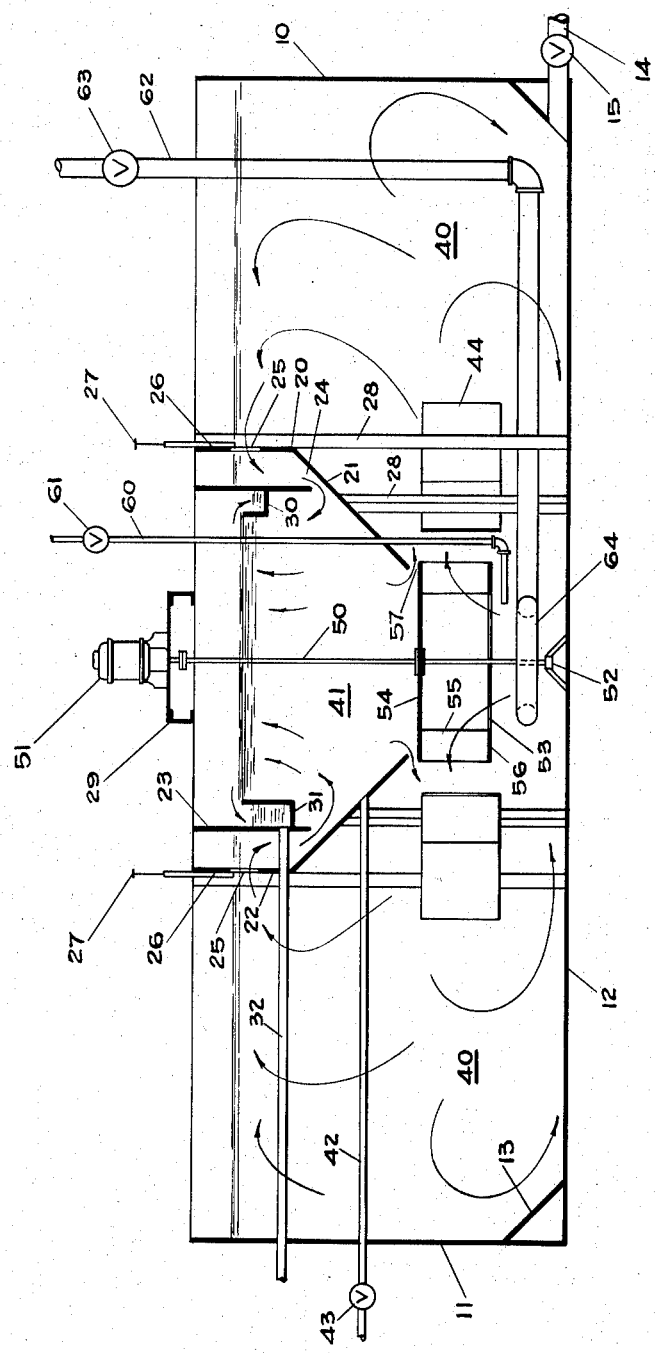

United States Patent Office 2,886,175
Patented May 12, 1959

2,886,175

APPARATUS FOR TREATING A LIQUID WITH A GAS

Anton A. Kalinske, Tucson, Ariz., assignor to Infilco, Incorporated, Tucson, Ariz., a corporation of Delaware Application March 26, 1956, Serial No. 573,881

8 Claims. (Cl. 210—208)

This invention relates to an apparatus for treating liquids or slurries, and particularly liquid wastes having a high B.O.D. (biochemical oxygen demand), with gas, usually air or other oxygen containing gas, in the presence of solids accumulated and retained from previously treated liquid, and clarifying the treated liquid.

The apparatus is designed for the treatment of relatively small quantities of liquid with large quantities of gas for relatively long periods, and may serve for the treatment of liquids by a combined aeration and solids contact process, such as the activated sludge process, or by treatment of the liquids with other gases in the presence of solids retained from previous treatment. In each case the treatment is followed by clarification within the apparatus.

It is an object of this invention to provide an improved apparatus for treating a liquid with a gas.

Another object of this invention is to provide an improved and economical apparatus for the purification and clarification of relatively small quantities of strong liquid wastes.

Another object is an improved apparatus for treating high strength wastes by means of aerobic biologically active sludge.

Another object is to provide an apparatus of this general type wherein the major portion of the tank forms the gas contact zone and the liquid-solids separation or clarification zone is relatively small.

Another object of the invention is to provide an apparatus of this general type affording a large rise area for the gas, which is free of obstructions.

Another object is to provide in an apparatus of this general type a rotor capable of pumping a liquid-solids mixture from an upper liquid-solids separation zone into the subjacent portion of the treating tank and of dispersing the pumped liquid-solids mixture and newly entering liquid and gas over the entire cross-sectional area of the treating tank.

Other objects will become apparent upon consideration of the detailed description and the claims which follow.

In apparatus wherein treatment of liquid wastes with gas and clarification are combined, it is usual to provide a centrally located gas contact chamber, surrounded by a liquid-solids separation or clarification chamber which is confined by the walls and bottom of the tank and separated from the gas contact chamber by a cylindrical or frusto-conical hood-like baffle, usually of steel. This structural arrangement is very satisfactory in the treatment of relatively large quantities of wastes having a low B.O.D. (biochemical oxygen demand), say up to about 500 p.p.m (parts per million), as for example in the treatment of municipal sewage by the activated sludge process, as such wastes require a large liquid-solids separation zone, and, due to the relatively small quantities of gas and short gas contact time used in their treatment, the gas contact chamber can be smaller than the clarification chamber.

When treating relatively small quantities of liquid wastes of high strength this arrangement becomes uneconomical. The long gas contact time and the large gas volumes applied in the treatment of such wastes require a large contact volume, and under such circumstances the baffle forming the gas contact chamber becomes very large and expensive due to the large quantities of steel involved. On the other hand, in the treatment of such small quantities of high strength wastes the clarification chamber can be relatively small.

To provide an economical structure for the treatment of relatively small quantities of high strength wastes I suggest to use the tank proper as a gas contact chamber which may extend over the entire width and height of the tank, and to mount in an upper central portion of this gas contact chamber a relatively small partition structure forming the liquid-solids separation or clarification chamber. The partition structure is shaped to provide an inlet channel connecting the clarification chamber with the upper part of the gas contact chamber, and is open at its bottom to the underlying portion of the gas contact chamber, so that a return flow from the clarification chamber to the gas contact chamber can take place.

The invention will be more readily understood by reference to the drawing showing an apparatus according to the invention in vertical cross-section.

The apparatus in its preferred form comprises a basin or tank 10 of any suitable shape, such as, for example, square or round. The basin 10 has a side wall or walls 11 and a substantially flat bottom 12. A fill 13 may be provided to facilitate flow to the center of the tank and avoid deposits on the bottom along the wall 11. A drain pipe 14, provided with a valve 15, leads from the lower portion of the basin 10.

Axially aligned within the central upper portion of the tank 10 is a vertically extending partition structure 20 which is shown for purposes of illustration as an inverted frusto-conical portion 21 merging into a cylindrical portion or tube 22. The partition structure 20 is open at its bottom to the lower portion of the tank. A cylindrical wall or tube 23 extends from an elevation above the normal liquid level in the tank 10 downwardly to an elevation adjacent that of the lower end of the tube 22 and forms therewith a passageway 24. The tube 22 may extend to an elevation below the normal liquid level in the tank 10 and be provided with an overflow, such as a weir, or, as shown, the tube 22 may extend to the top of the tank and be fitted with ports or windows 25. Gates 26 can be provided to control the size of the opening of the windows 25. Vertical adjustment may be imparted to all gates 26 simultaneously by any suitable means, not shown, or each gate may be adjusted individually, as by the hand wheels 27.

The partition structure 20 may be supported in spaced relationship to the bottom of the tank 10 by any suitable means, such as a plurality of columns 28 symmetrically affixed to the outside of the partition structure 20. The columns also support a bridge 29 extending from the side wall to beyond the central portion of the tank 10. The cylindrical wall 23 may derive support directly from the tube 22 or from the bridge 29. A launder 30 is attached to the wall 23 around its inner periphery and communicates through a collection box 31 with an effluent conduit 32.

The structure described above defines a large gas contact chamber 40 extending from the bottom of the tank to the liquid surface over the major portion of the cross-sectional area of the tank, and a relatively small, centrally located liquid-solids separation chamber or compartment 41. The two chambers are in hydraulic communication with one another at an upper elevation through the ports 25 and the passageway 24, and at a lower elevation through the opening at the end of partition structure 20. An outlet conduit 42, provided with a valve 43, may lead from a lower portion of the chamber 41 to outside the tank.

Radial baffles 44 may be attached to the columns 28 near the bottom of the tank 10 to reduce rotation of liquid in the outer portion of the gas contact chamber 40 about the vertical axis of the tank.

Axially aligned in the tank 10 is a shaft 50. The shaft 50 may be driven by any suitable means, such as a motor-reducer 51 which may be supported above the tank 10, as on the bridge 29. The lower end of the shaft 50 may be journaled in a bearing 52, as shown.

A rotor-disperser 53 of the radial flow type is rigidly affixed to the shaft 50 at an elevation subjacent the open lower end of partition structure 20. It may include a horizontal plate 54, a suitable number of radially mounted vertical blades 55 attached to the underside of the plate 54, and extending only partway to the shaft 50, and a lower annular plate 56 of the same width as the blades 55. While for clarity's sake only two blades 55 are shown in the drawing, it will be obvious that a number of blades are uniformly mounted about the periphery of the plate 54. The plate 54 preferably is mounted close to the lower end of partition structure 20, so as to form therewith a restricted passageway 57.

The inlet means for the liquid to be treated and the gas to be used in treating the liquid may take the form of a liquid inlet conduit 60, provided with a valve 61, and a gas inlet pipe 62 provided with a valve 63 and a distributing outlet or sparger ring 64. It is essential in my apparatus that the liquid to be treated and the gas used in the treatment be introduced into the suction flow of the rotor-disperser 53, so that both are immediately picked up and dispersed throughout the circulating contents of gas contact chamber 40. While the liquid inlet 60 can discharge into the suction flow at any desired point, the gas should always be discharged subjacent the plate 54 to prevent its escape before it has been dispersed through the liquid.

Although I have shown and described, for purposes of illustration, a single rotor-disperser in a non-elongated tank, it should be understood that the invention also is applicable to longitudinal tanks, in which case two or more rotors would be used.

The operation of the apparatus will be readily understood. The liquid wastes to be treated may be raw wastes or settled raw wastes, depending on the characteristics of the specific wastes. Other suitable treatment steps may precede the treatment in the new apparatus.

Solids from previously clarified liquid are retained in the process in a manner hereinafter described, so that the gas contact chamber is filled with a relatively concentrated liquid-solids mixture.

Upon its rotation the rotor 53 sets up a flow pattern in the liquid-solids mixture in the gas contact chamber 40 in predominantly horizontal paths, having an upper outwardly spiraling component at the elevation of the plate 54, a downwardly spiraling component along the side wall 11, an inwardly spiraling component along the bottom 12 and an upwardly spiraling component back to the rotor. Undue rotation of the chamber 40 is counteracted by the radial baffles 44. Liquid to be treated enters the chamber 40 through conduit 60 and gas through conduit 62 and sparger ring 64. The liquid and gas are discharged into the suction flow of the rotor 53, so that they are quickly dispersed through, and incorporated in, the circulating liquid-solids mixture. The gas is broken up by the rotor in minute bubbles from which oxygen is readily adsorbed by the liquid. Gas bubbles separating from the circulation rise through a large free rising space to the top of the gas contact chamber 40, producing a gas lift action which causes the liquid-solids mixture to rise to the upper portion of the chamber 40, flow through the windows 25 and the passageway 24 and enter the liquid-solids separation or clarification chamber 41. Due to the lifting action of the rising gas bubbles, the liquid level in the chamber 40 ordinarily is slightly higher than the level defined by the launder 30. The large open surface of the gas contact chamber favors the escape of the undissolved gases, so that the liquid-solids mixture entering the chamber 41 is practically free of undissolved gases.

In the chamber 41 clarified liquid separates from the liquid-solids mixture and rises to the launder 30 to be withdrawn from the basin 10 through outlet conduit 32. The tube 23 shelters the upper portion of the chamber 41 from turbulence and provides a quiescent zone therein. The balance of the liquid-solids mixture, including the solids left behind by the clarified liquid returns to the gas contact chamber 40 through the apertured bottom of the partition 21. While the gas lift usually is sufficient to cause this circulation I prefer to supplement it with the positive pumping action of the plate 54 by positioning the rotor 53 so as to form the restricted passageway 57. This has the advantage that there is always sufficient power for the recirculation, and that the liquid-solids mixture is directed laterally outwardly through the slot 57, so that solids are prevented from depositing on the plate 54. In this manner the solids concentration in the aeration zone is built up. When the desired degree of concentration has been reached, solids are withdrawn from the basin either continuously or intermittently, to maintain the concentration at the predetermined value and the location of the interface at which clarified liquid separates from the liquid-solids mixture at the desired elevation. The solids may be withdrawn from any suitable part of the gas contact chamber, for example through conduit 14, preferably, however, a portion of the relatively concentrated liquid-solids mixture in the lower portion of the clarification chamber 41 is withdrawn through conduit 42.

The recirculation established by the lifting action of the gases rising to the surface of the gas contact chamber 40 and by the pumping action of plate 54 may comprise several times the volume of the throughput flow. The rate of flow of the recirculation can be controlled by positioning of the gates 26 which cooperate with the windows 25 to provide orifices of variable size.

It will be seen that the invention provides a combined purification and clarification apparatus affording a gas contact zone of sufficient size for contacting high strength liquid for long periods with large quantities of gas, without requiring expensive construction.

Many modifications and variations of the invention, as set forth herein, may be made without departing from the spirit and scope of the invention. Accordingly, the drawing and specification herein are to be considered for purposes of illustration rather than of limitation.

I claim:

1. Apparatus for treating a liquid with a gas in the presence of solids accumulated and retained from previously treated liquid, and clarifying the liquid, comprising a gas contact chamber, inlet means for introducing gas and liquid to be treated to said gas contact chamber, a liquid-solids separation compartment mounted in an upper central portion of said gas contact chamber, said liquid-solids separation compartment being in hydraulic communication with an upper and a lower level of said gas contact chamber through upper and lower passageways, respectively, wall means in said liquid-solids separation compartment forming a quiescent zone therein, a rotor of the radial flow type in said gas contact chamber and having a plate subjacent of and restricting said lower passageway, said inlet means for gas and liquid to be treated discharging underneath said rotor, means for rotating said rotor, said rotor, upon its rotation, pumping liquid-solids mixture from said liquid-solids separation compartment into said gas contact chamber and dispersing said mixture and newly entering liquid to be treated and gas through the contents of said gas contact chamber, means for withdrawing clarified liquid from said liquid-solids separation compartment, and means for withdrawing excess solids to waste.

2. Apparatus for treating a liquid with a gas in the presence of solids accumulated and retained from previously treated liquid, and clarifying the liquid, comprising a tank having a bottom and at least one upstanding wall, a partition structure in the upper central portion of said tank forming therein a liquid-solids separation chamber including a quiescent zone in its upper portion, means for withdrawing clarified liquid from said upper portion of said liquid-solids separation chamber and a liquid-solids mixture from a lower portion thereof, the balance of said tank forming a gas contact chamber with a rise and escape area for the gas free of obstructions and extending over the major portion of the cross-sectional area of said tank, said liquid-solids separation chamber being in hydraulic communication with an upper level and a lower level of said gas contact chamber through upper and lower passageways, respectively, a rotor of the radial flow type axially aligned in said tank, said rotor having a plate subjacent of and restricting said lower passageway, and a plurality of blades extending downwardly from said plate, inlet means for liquid to be treated and for gas discharging underneath said rotor, said rotor, upon its rotation, pumping liquid-solids mixture from said liquid-solids separation chamber through said lower passageway into said gas contact chamber and dispersing said mixture and newly entering liquid to be treated and gas through the contents of said gas contact chamber, and means for rotating said rotor.

3. Apparatus for treating a liquid with a gas in the presence of solids accumulated and retained from previously treated liquid and clarifying the liquid, comprising a tank having a bottom and at least one upstanding wall, said tank forming a gas contact chamber extending over the entire cross-sectional area of said tank and having vertical extension from the bottom to the top of the tank over the major portion of said cross-sectional area, a partition structure centrally arranged in, and occupying only a minor portion of, the upper portion of said tank and forming a liquid-solids separation chamber within said gas contact chamber, said partition structure having an open top and bottom and including a quiescent zone in its upper portion, an overflow from the upper portion of said gas contact chamber to said liquid-solids separation chamber, a rotor of the radial flow type rotatably mounted in the gas contact chamber underneath the open bottom of said partition structure, said rotor having a plate and a plurality of blades affixed to the lower side of said plate, said plate forming with the lower end of said partition structure a restricted passageway between said chambers and being adapted to pump, upon rotation of said rotor, liquid-solids mixture from said liquid-solids separation chamber through said passageway into said gas contact chamber, means for rotating said rotor, means for withdrawing clarified liquid from said upper portion of said liquid-solids separation chamber, means for withdrawing controlled amounts of liquid-solids mixture from said tank, and inlet means for liquid and for gas used in the treatment, said inlet means discharging underneath said rotor.

4. Apparatus for treating a liquid with a gas in the presence of solids accumulated and retained from previously treated liquid, and clarifying the liquid, comprising a gas contact chamber having a bottom and at least one upstanding wall, inlet means for gas and for liquid to be treated to said gas contact chamber, a liquid-solids separation compartment mounted in an upper central portion of said gas contact chamber, said liquid-solids separation compartment having at least one side wall and an apertured bottom for flow from said compartment to said chamber, said side wall having at least one opening for flow from said chamber to said compartment, a partition extending within said liquid-solids separation compartment from the elevation of the top of said upstanding wall to an elevation below said opening and forming in the upper portion of said liquid-solids separation compartment a quiescent zone, a clarified liquid outlet launder affixed to said partition, an effluent conduit leading from said launder, a rotor of the radial flow type mounted underneath said apertured bottom and having a plate of larger diameter than said apertured bottom, and a plurality of radial blades affixed to the lower side of said plate, said rotor, upon its rotation, setting up a flow pattern including an upper outwardly spiraling discharge flow and a lower inwardly spiraling suction flow, a plurality of radial baffles mounted around and in spaced relationship to said rotor, means for withdrawing excess solids from said tank, said inlet means for gas and liquid to be treated discharging into the suction flow of said rotor, and means for rotating said rotor.

5. Apparatus for treating a liquid with a gas in the presence of solids accumulated and retained from previously treated liquid, and clarifying the liquid, comprising a gas contact chamber having a bottom and at least one upstanding wall, inlet means for gas and for liquid to be treated to said chamber, a liquid-solids separation compartment mounted in an upper central portion of said chamber, said compartment having at least one side wall and an apertured bottom, said side wall having a plurality of openings for flow from said chamber to said compartment, a partition extending within said compartment from the elevation of the top of said upstanding wall to an elevation below said openings and forming in the upper portion of said compartment a quiescent zone, a rotor of the radial flow type having a plate of larger diameter than, and mounted underneath, said apertured bottom, and a plurality of radial blades affixed to the lower side of said plate, said rotor, upon its rotation, setting up a flow pattern in said gas contact chamber including an upper outward flow at the elevation of said plate and a lower inward flow adjacent the bottom of said chamber, means for withdrawing clarified liquid from said upper portion of said compartment, means for discharging excess solids from said tank, said inlet means discharing into the said inward flow of said rotor, and means for rotating said rotor.

6. Apparatus for treating a liquid with a gas in the presence of solids accumulated and retained from previously treated liquid, and clarifying the liquid, comprising a gas contact chamber having a bottom and at least one upstanding wall, inlet means for gas and for liquid to be treated to said chamber, a liquid-solids separation compartment mounted in an upper central portion of said chamber, said compartment having at least one side wall and an apertured bottom, said side wall having a plurality of openings for flow from said chamber to said compartment, adjustable gates mounted on said side wall and controlling flow through said openings, a partition extending within said compartment from the elevation of the top of said upstanding wall to an elevation below said openings and forming a quiescent zone in said compartment, a rotor of the radial flow type having a plate of larger diameter than, and mounted underneath, said apertured bottom, thereby forming with the lower portion of said side wall a restricted passageway, a plurality of radial baffles mounted around and in spaced relationship to said rotor, means for withdrawing clarified liquid from said quiescent zone, means for withdrawing excess solids from said compartment, and means for rotating said rotor, said rotor, upon its rotation, pumping liquid-solids mixture from said compartment through said restricted passageway, into said chamber and dispersing said mixture and newly entering liquid to be treated and gas through the contents of said chamber, the flow pattern set up by said rotor in said chamber including an inward suction flow adjacent the bottom of said chamber, said inlet means discharging into said suction flow of said rotor.

7. Apparatus for treating a liquid with a gas in the presence of solids accumulated and retained from previously treated liquid, and clarifying the liquid, comprising a gas contact chamber, inlet means for introducing gas and liquid to be treated to said chamber, a liquid-solids separation compartment in said chamber, said compartment occuping a minor portion only of the upper part of said chamber so as to leave a large free rise and escape area for the gas outside said compartment, upper and lower passageways connecting said compartment with said chamber at different elevations to provide for a circulation of liquid-solids mixture from said chamber through said compartment and back to said chamber, means providing in said compartment a quiescent zone, a rotor of the radial flow type in said chamber underneath said lower passageway, said rotor, upon its rotation, setting up a flow pattern including an upper outwardly directed discharge flow and a lower inwardly directed suction flow, said inlet means discharging into said suction flow, means for rotating said rotor, means for withdrawing clarified liquid from said quiescent zone of said compartment, and outlet means for withdrawing excess solids from said apparatus.

8. Apparatus for treating a liquid with a gas in the presence of solids, comprising a gas contact chamber, inlet means for introducing gas and liquid to said chamber, a liquid-solids separation compartment in said chamber, said compartment occupying a minor portion only of the upper part of said chamber so as to leave a large free rise and escape area for the gas, upper and lower passageways establishing hydraulic communication between said compartment and said chamber at different elevations, means providing a quiescent zone in the upper portion of said compartment, a rotor of the radial flow type in said chamber subjacent of said lower passageway, means for rotating said rotor, said rotor, upon its rotation, pumping liquid-solids mixture from said compartment through said lower passageway into said chamber and dispersing said mixture and newly entering liquid and gas through the contents of said chamber, the flow pattern set up by said rotor in said gas contact chamber including an upper outward discharge flow and a lower inward suction flow, said inlet means discharging into the suction flow of said rotor, means for withdrawing clarified liquid from said quiescent zone of said compartment, and outlet means for withdrawing excess solids from said apparatus.

References Cited in the file of this patent

UNITED STATES PATENTS

| | | |
|---|---|---|
| 2,021,672 | Spaulding | Nov. 19, 1935 |
| 2,240,671 | Sborlino | May 6, 1941 |
| 2,243,309 | Daman et al. | May 27, 1941 |
| 2,296,437 | Green | Sept. 22, 1942 |
| 2,316,770 | Daman et al. | Apr. 20, 1943 |
| 2,411,386 | Parker et al. | Nov. 19, 1946 |
| 2,477,948 | Allen | Aug. 2, 1949 |
| 2,678,916 | Kalinske | May 18, 1954 |

FOREIGN PATENTS

| | | |
|---|---|---|
| 1,021,655 | France | Dec. 3, 1952 |